US008356274B2

(12) United States Patent
Kwok et al.

(10) Patent No.: US 8,356,274 B2
(45) Date of Patent: Jan. 15, 2013

(54) SYSTEM AND METHODS TO CREATE A MULTI-TENANCY SOFTWARE AS A SERVICE APPLICATION

(75) Inventors: Thomas Y. Kwok, Washington Township, NJ (US); Thao N. Nguyen, Katonah, NY (US); Linh H. Lam, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 1226 days.

(21) Appl. No.: 12/168,652

(22) Filed: Jul. 7, 2008

(65) Prior Publication Data

US 2010/0005443 A1 Jan. 7, 2010

(51) Int. Cl.
*G06F 9/44* (2006.01)
(52) U.S. Cl. .................... 717/104; 717/101; 717/106
(58) Field of Classification Search ................ 717/100
See application file for complete search history.

(56) References Cited

U.S. PATENT DOCUMENTS

| | | | |
|---|---|---|---|
| 7,503,031 B2 * | 3/2009 | Chang et al. ................ 717/101 |
| 7,730,478 B2 * | 6/2010 | Weissman .................... 717/106 |
| 7,774,504 B2 * | 8/2010 | Chene et al. ................. 717/101 |
| 7,991,790 B2 * | 8/2011 | Barker et al. ................. 707/785 |
| 8,108,825 B2 * | 1/2012 | Goodwin et al. ............. 717/104 |
| 2007/0150856 A1 * | 6/2007 | Warner et al. ............... 717/106 |
| 2008/0010243 A1 * | 1/2008 | Weissman et al. ............... 707/2 |
| 2008/0270987 A1 * | 10/2008 | Weissman .................... 717/124 |
| 2009/0049288 A1 * | 2/2009 | Weissman .................... 712/245 |
| 2009/0049422 A1 * | 2/2009 | Hage et al. ................... 717/104 |
| 2010/0115490 A1 * | 5/2010 | Wilcock et al. .............. 717/104 |
| 2011/0202911 A1 * | 8/2011 | Brooks et al. ................ 717/174 |

OTHER PUBLICATIONS

Stefan Aulbach, Multi-Tenant Database for Software as a Service: Schema-Mapping Techniques, 2008, ACM, 12 pages, <URL: http://delivery.acm.org/10.1145/1380000/1376736/p1195-aulbach.pdf>.*
John McHugh, Passive Network Forensics: Behavioural Classification of Network Hosts Based on Connection Patterns, 2008, ACM, 13 pages, <URL: http://delivery.acm.org/10.1145/1370000/1368520/p99-mchugh.pdf>.*
Surajit Chaudhuri, Self-Tuning Database Systems: A Decade of Progress, 2007, ACM, 12 pages, <URL: http://delivery.acm.org/10.1145/1330000/1325856/p3-chaudhuri.pdf>.*
Mumtaz Ahmad, Modeling and Exploiting Query Interactions in Database Systems, 2008, ACM, 10 pages, <URL: http://delivery.acm.org/10.1145/1460000/1458109/p183-ahmad.pdf>.*

(Continued)

*Primary Examiner* — Thuy Dao
*Assistant Examiner* — Hua Lu
(74) *Attorney, Agent, or Firm* — F. Chau & Associates, LLC; Preston J. Young

(57) ABSTRACT

A method for providing multi-tenant services includes receiving a request from a user, establishing tenancy information for the user, wherein the tenancy information is selected which corresponds to a tenant of the user from among multiple tenants, customizing the request according to the tenancy information established for the user, forwarding the request to an application that is not multi-tenant aware, receiving results of the request from the application, customizing the results according to the tenancy information established for the user and corresponding to the tenant of the user, and returning customized results to the user.

17 Claims, 8 Drawing Sheets

OTHER PUBLICATIONS

Chang-Hao Tsai, Virtualization-Based Techniques for Enabling Multi-tenant Management Tools, 2007, Google Scholar, 12 pages, <URL: http://www.springerlink.com/content/1162wx1x47616755/fulltext.pdf>.*

Rouven Krebs, Architectural Concerns in Multi-Tenant SaaS Applications, 2008, Google Scholar, 6 pages, <URL: http://sdqweb.ipd.kit.edu/publications/pdfs/KrMoKo2012-closer-multitenant-sass.pdf>.*

* cited by examiner

SYSTEM AND METHODS TO CREATE A MULTI-TENANCY SOFTWARE AS A SERVICE APPLICATION

BACKGROUND

1. Technical Field

The present invention relates to software provided as a service, and more particularly to a system and method for processing requests from multiple tenants.

2. Discussion of Related Art

Software-as-a-Service (SaaS) lowers the cost of development, customization, deployment and operation of a software application while supporting multiple tenants over the Internet. In general, SaaS is associated with business software applications. SaaS is a Web-based software application deployed and operated as a hosted service over the Internet and accessed by users.

In a SaaS model, multi-tenancy support can be applied to four different software layers: the application, middleware, the Virtual Machine (VM), and the operating system layers. Referring to FIG. 1, for the application layer, there are four levels of SaaS maturity model. Level one 101 has a separate instance for each tenant's customized code base and it is similar to the Application Service Provider (ASP) software application model. Level two 102 has a separate instance for each tenant but the instances come from a single code base with configuration options. Level three 103 has a single instance for all tenants with configurable metadata for each tenant. Level four 104 has a load-balanced farm of identical instances with configurable metadata for its tenants.

Contract management is an example of a SaaS application of the level three type; Contracts are required in most business transactions as they constitute the binding relationships between parties. Automation of some contract management tasks in the electronic contract lifecycle creates a substantial value. This value stems from improved productivity and security, effectively aggregated contract information; accelerated contract transaction time and lifecycle processes; reduced contractual errors and risk; enabled revenue forecast and profit optimization as well as better compliance enforcement. Different companies have different requirements on presentations, business rules, workflows, document flows, database and security in managing their contracts.

In most commercial electronic contract management applications available today, different customized code base has to be developed, deployed and operated to support each tenant. Few advanced commercial electronic contract management applications use a single code base with configuration options to support multi-tenants. However, typically a separate instance of the code base still needs to be deployed and operated for each tenant even in these applications to achieve scalability. Development and maintenance costs associated with a service or business model supporting a single application instance for each tenant, e.g., as in an electronic contract management application and other business applications, can render such a service unaffordable for some tenants.

Therefore, a need exists for a system and method for a non-tenant aware SaaS application supporting multi-tenancy.

BRIEF SUMMARY

According to an embodiment of the present disclosure, a method for providing multi-tenant services includes receiving a request from a user, establishing tenancy information for the user, wherein the tenancy information is selected which corresponds to a tenant of the user from among multiple tenants, customizing the request according to the tenancy information established for the user, forwarding the request to an application that is not multi-tenant aware, receiving results of the request from the application, customizing the results according to the tenancy information established for the user and corresponding to the tenant of the user, and returning customized results to the user.

According to an embodiment of the present disclosure, a method for providing multi-tenant services may be implemented in a computer readable medium embodying instructions executable by a processor.

According to an embodiment of the present disclosure, a system for supporting multi-tenancy communications with a non-tenant aware application executing on a processor includes an input means for receiving a request from a user device, a multi-tenancy metadata database in communication with the system for storing a user-tenant relationship, customization parameters, tenant-metadata relationships and application interfaces, and a tenant aware means for establishing tenancy information for the user from the multi-tenancy metadata database, customizing the request for a tenant of the user including the tenancy information, and forwarding the request to the non-tenant aware application, wherein the non-tenant aware application generates results corresponding to the request and returns the results to the tenant aware means, wherein the tenant aware means customizes the results for the tenant, and returns customized results to the user device.

BRIEF DESCRIPTION OF THE SEVERAL VIEWS OF THE DRAWINGS

Preferred embodiments of the present disclosure will be described below in more detail, with reference to the accompanying drawings.

DETAILED DESCRIPTION

According to an embodiment of the present disclosure, a multi-user but not multi-tenant aware application can be deployed and operated over a network, such as the Internet, as a SaaS business model to support multiple tenants using an administration tool/module allowing each tenant to customize the application's presentations and Web pages, business rules, workflows, document flows, data structures, email contents and application specific parameters through the application's metadata configuration. Each tenant is a set of one or more users having common tenancy information for a customizable application.

According to an embodiment of the present disclosure, metadata, security and shared services, application customization and tenant extension modules are maintained for each tenant by the administration tool/module (hereinafter the multi-tenancy SaaS model) to support multi-tenancy SaaS for a multi-user but not multi-tenant aware application (here the application can be implemented as a single code base in a single deployment). The multi-tenancy SaaS model augments the application to provide a tenant aware layer between users and the application, wherein different users may belong to different tenants as supported by the multi-tenancy SaaS model. Each tenant supported by the multi-tenancy SaaS model is associated with its own data, such that two different tenants may interact with the same application in environments customized for each tenant, including for example, customized presentations (e.g., interfaces), workflows, business rules, etc.

The multi-tenancy SaaS model can reduce the application hosting cost and make the application more affordable to the tenants because of its capabilities in customization and scalability while continuing to support an increasing number of tenants. The multi-tenancy SaaS model furthers benefits tenants by reducing money and time costs with immediate access to the latest Information Technology (IT) innovations and infrastructure improvements on a single application code base.

Figure 1:
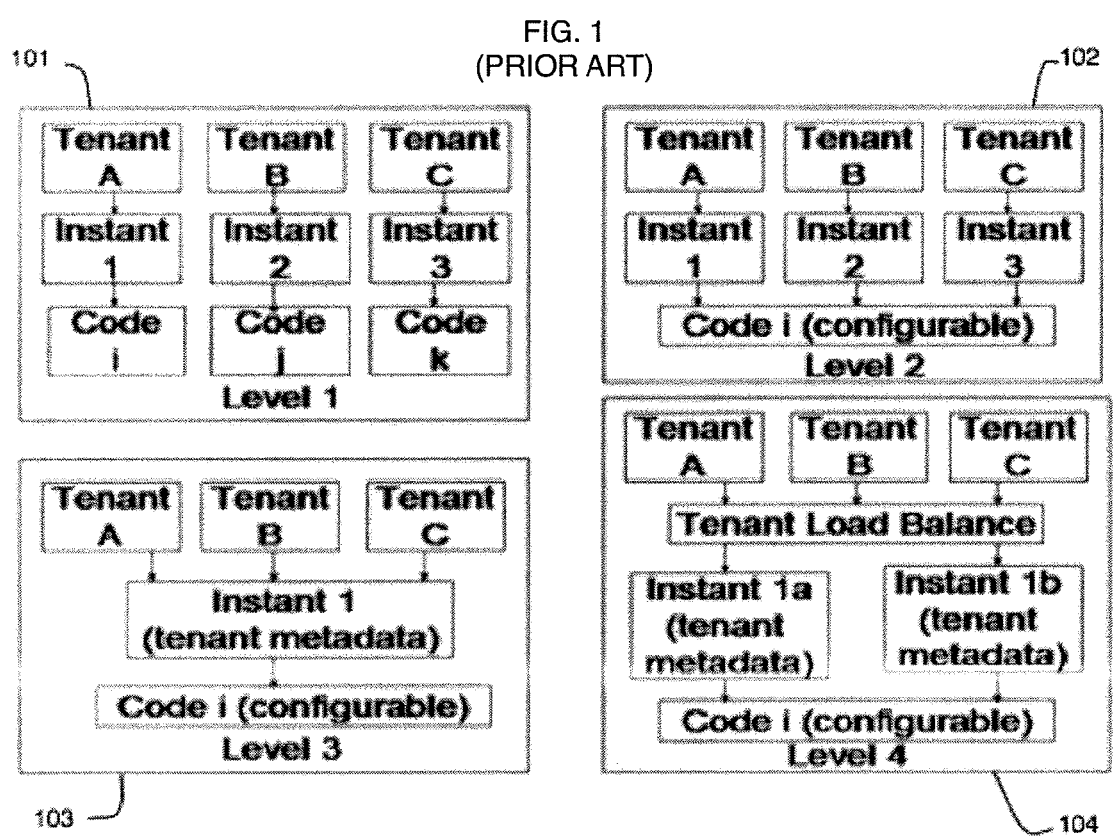
FIG. 1 is an SaaS maturity model.
Figure 2:
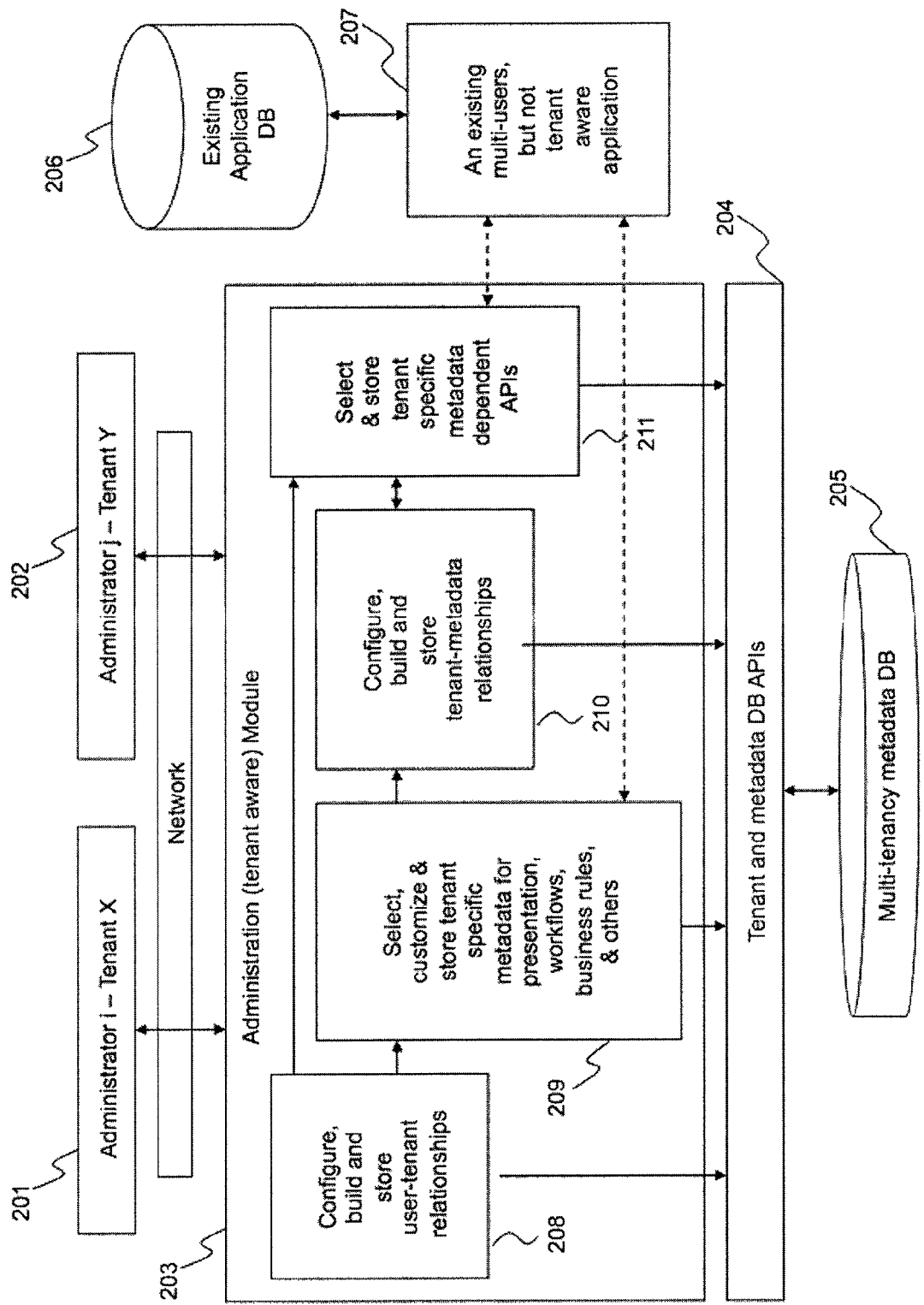
FIG. 2 is an architectural diagram of a non-tenant aware system for supporting multi-tenancy during administrative initial setup according to an embodiment of the present disclosure.

FIG. 2 shows an architecture for enabling an non-tenant aware application to support multi-tenancy during an initial administration setup. An administrator 201 from a tenant X and/or an administrator 202 from a tenant Y logs into a SaaS system, e.g., through a network, using a web browser 203. The administrator is directed to a tenant aware administration module 203. The tenant aware administration module 203 allows the administrator to configure, build and store user tenant related relationships as shown in block 208 through the tenant and metadata database Application Program Interfaces (APIs) 204 to a persistent store for multi-tenancy metadata database 205. The tenant aware administration module 203 allows the administrator to select, customize and store tenant specific metadata for presentation, workflows, business rules and other application specific customizable parameters as shown in block 209. The metadata is stored through the tenant and metadata database APIs 204 to the persistent store for multi-tenancy metadata database 205. The tenant aware administration module 203 allows the user to configure, build and store tenant-metadata relationships as shown in block 210 through the tenant and metadata database APIs 204 to the persistent store for multi-tenancy metadata database 205. The tenant aware administration module 203 also allows the administrator to select and store tenant specific metadata dependent APIs as shown in block 211 the tenant and metadata database APIs 204 to the persistent store for multi-tenancy metadata database 205. The tenant specific metadata dependent APIs 204 provide a wrapper to an existing multi-user, but not multi-tenant aware application 207, enabling the application 207 to provide multi-tenant support. The application 207 may already have an existing application database 206 for serving different users. The non-tenant aware application 207 does not natively share resources across tenants nor maintain differentiated data belonging to different tenants without the tenant aware administration module 203. The tenant aware administration module 203 communicates to the existing application 207 through the wrapper APIs 211.

Figure 3:
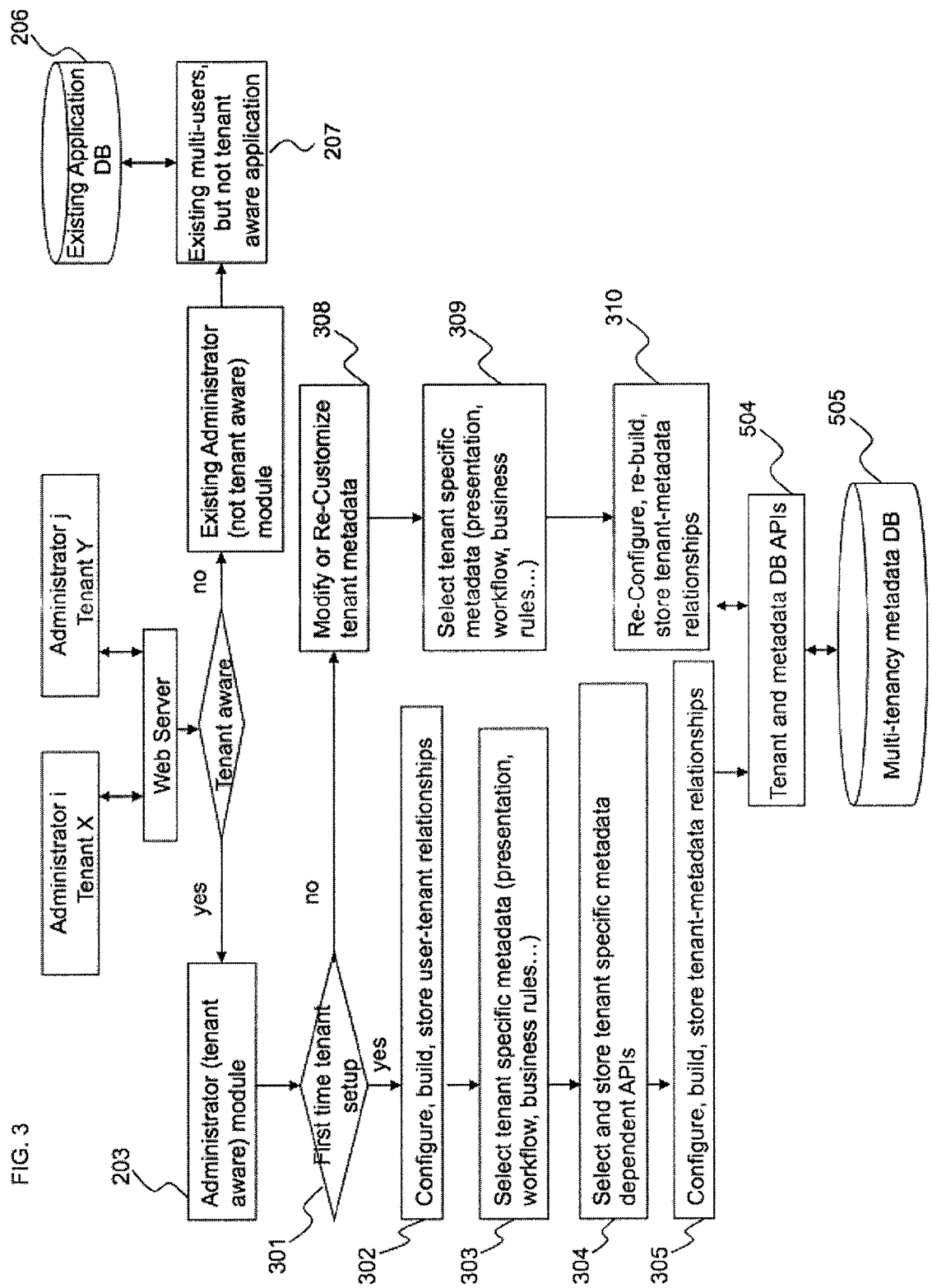
FIG. 3 is a flowchart for customizing a non-tenant aware application to support multi-tenancy during administrative setup or update according to an embodiment of the present disclosure.

FIG. 3 shows a flowchart for customization of a non-tenant aware application 207 to support multi-tenancy during an administration setup or an administration update. When one or more administrators from different tenants log into a web server hosting the application 207, the application 207 is checked to determine whether it is capable of being tenant aware. If it is capable of being tenant aware, the login request will be directed to the tenant aware administration module 203. For the setup, the administrator is directed to configure, build and store the user-tenant relationships 302, e.g., specifying which users belong to a tenant. The administrator selects tenant specific metadata 303, e.g., presentation, workflow, business rules and other application specific customizable parameters. The administrator selects and stores the tenant specific metadata dependent APIs at block 304. The tenant specific metadata dependent APIs specify, for example, a configuration of an interface of the application. The administrator configures, builds and stores the tenant-metadata relationships at block 305, using the tenant and metadata database APIs 504, to the multi-tenancy metadata database 505. The tenant-metadata relationship associates a tenant with its metadata. If the administrator logs in to update the tenant information as determined at block 301 then the request is directed to block 308 which allows the administrator to select tenant specific metadata 309 and re-configure or rebuild and store the tenant-metadata relationships at block 310.

Figure 4:
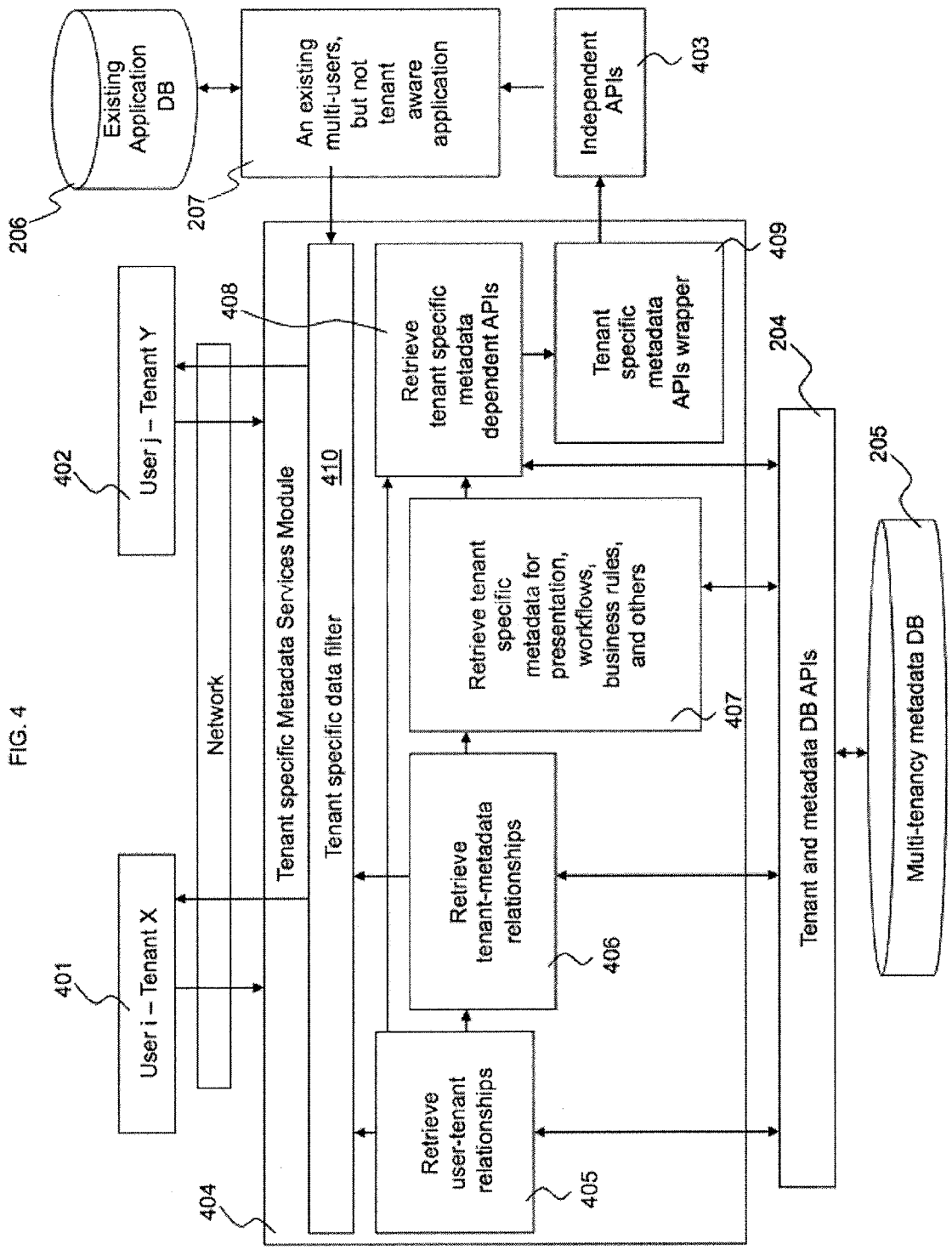
FIG. 4 is an architectural diagram of the tenant specific Metadata Services to enable a non-tenant aware system to support user requests for multi-tenancy according to an embodiment of the present disclosure.

FIG. 4 shows an architecture of tenant specific metadata services for enabling a non-tenant aware application 207 to support multi-tenancy to handle user requests. Users from different tenants 401 and 402 send requests to the application 207, and the application 207 filters response data based on the user's tenant specific data 410. Once the users are identified to belong to a specific tenant organization, the system retrieves the user-tenant relationships 405, retrieves the tenant-metadata relationships 406, and retrieves tenant specific metadata for presentation, workflows business rules and other customized application specific parameters 407. The tenant specific metadata services module 404 also retrieves the tenant specific metadata dependent APIs 408 along with its APIs wrapper 409. Through the API wrapper, the data for the user requests can passed back and forth through application independent APIs 403 to the application 207 and the application database 206 to retrieve the desire data. The tenant specific data targeted by the user requests will be retrieved through the tenant and metadata database APIs 204 from the multi-tenancy metadata database 205.

Figure 5:
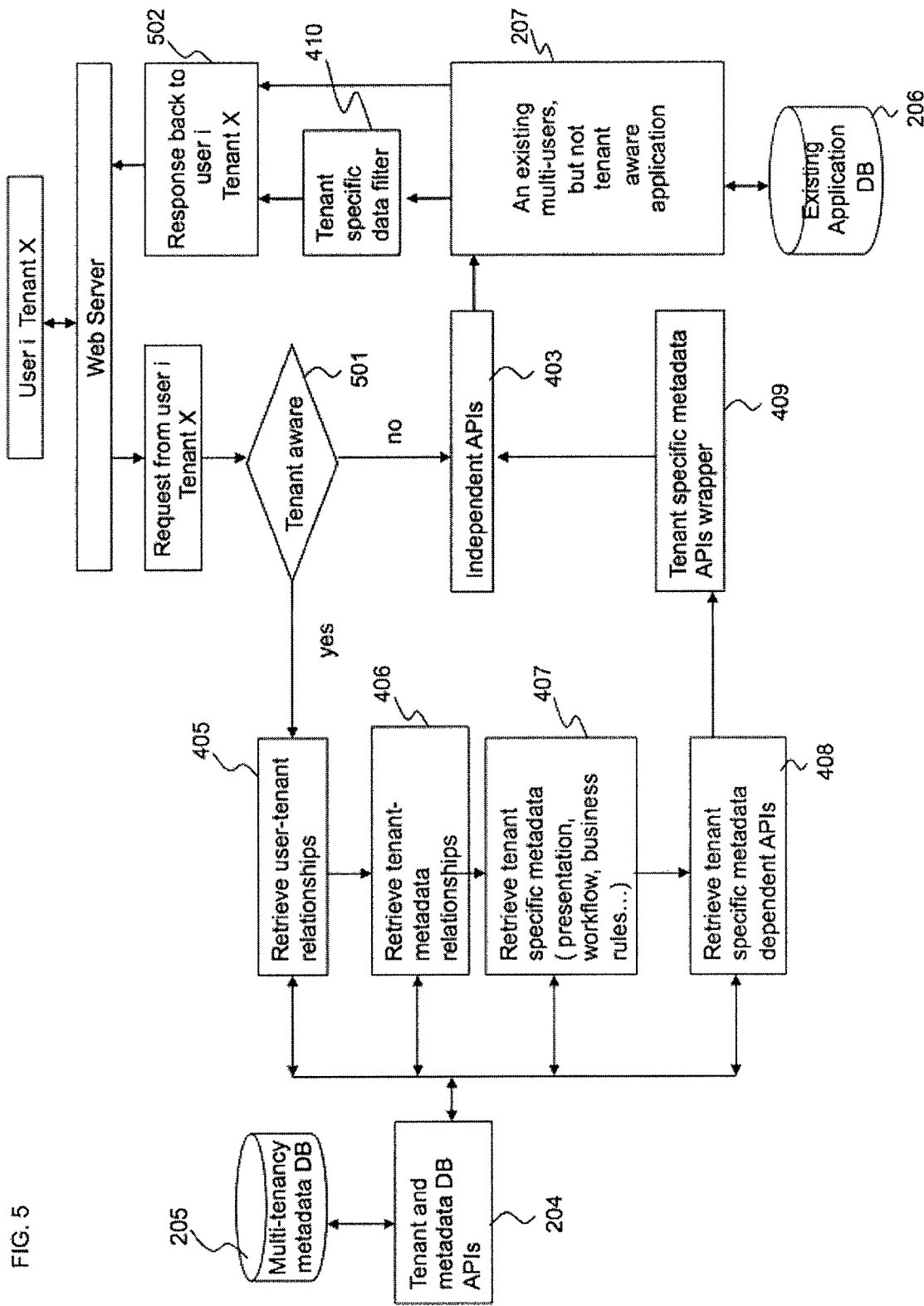
FIG. 5 is a flowchart for processing tenant specific user requests according to an embodiment of the present disclosure.

FIG. 5 is a flowchart for processing tenant specific user request based on the proposed architecture in FIG. 4. When a user I from a tenant X sends a request to a system 207 described as in FIG. 4, if the system 207 is determined to be tenant aware at block 501 then data is retrieved at blocks 405, 406, 407, 408, which is wrapped with the request at block 409. The request passed to the independent APIs 403 and to the application 207 to retrieve data in response to the request from the database 206. The retrieved data is passed through the tenant specific data filter 410 before returning to the user at block 502. If the system 207 is not capable of being tenant aware, the independent APIs 403 are used to communicate with the user at block 502 to retrieve data from the database 206 and return the data directly to the user at block 502 without using the tenant specific data filter at block 410.

Figure 6:
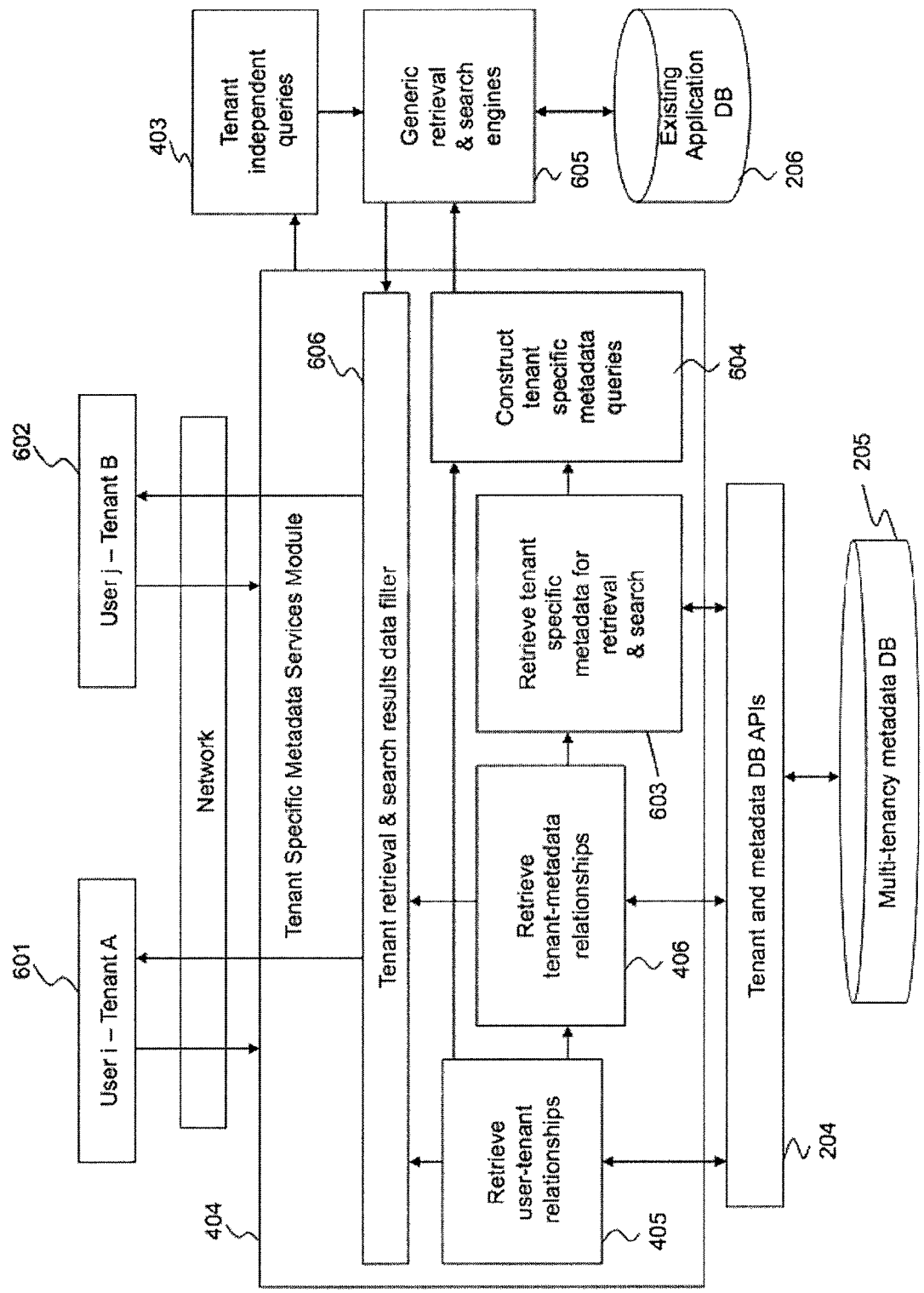
FIG. 6 is an architectural diagram of the tenant specific Metadata Services to enable a non-tenant aware system to support multi-tenancy retrieval and search functions according to an embodiment of the present disclosure.

FIG. 6 shows an architecture of the tenant specific metadata services module 404 to enable a non-tenant aware system to support multi-tenant retrieval and search functions. Users from different tenants 601 and 602 initiate a retrieval/search request to a retrieval or search engine 605. The request is directed to the tenant specific metadata services module 404 where data is retrieve at blocks 405 and 406. Tenant specific metadata for the retrieval and search requests is retrieved at block 603 and tenant specific metadata queries are constructed at block 604 for the requests. Data retrieval at blocks 405, 406 and 603 access the multi-tenancy metadata database 205 through the tenant and metadata database APIs 204. The queries 604 are passed on to the generic retrieval and search engines 605 which works with the existing application database 206 to retrieve search results. The search results pass to the tenant retrieval and search results data filter 606 before returning back to the tenants 601 and 602. If the request is not tenant specific then it is directly routed to the generic retrieval and search engine 605 via block 403 to find the result set before it is returned to the users.

Figure 7:
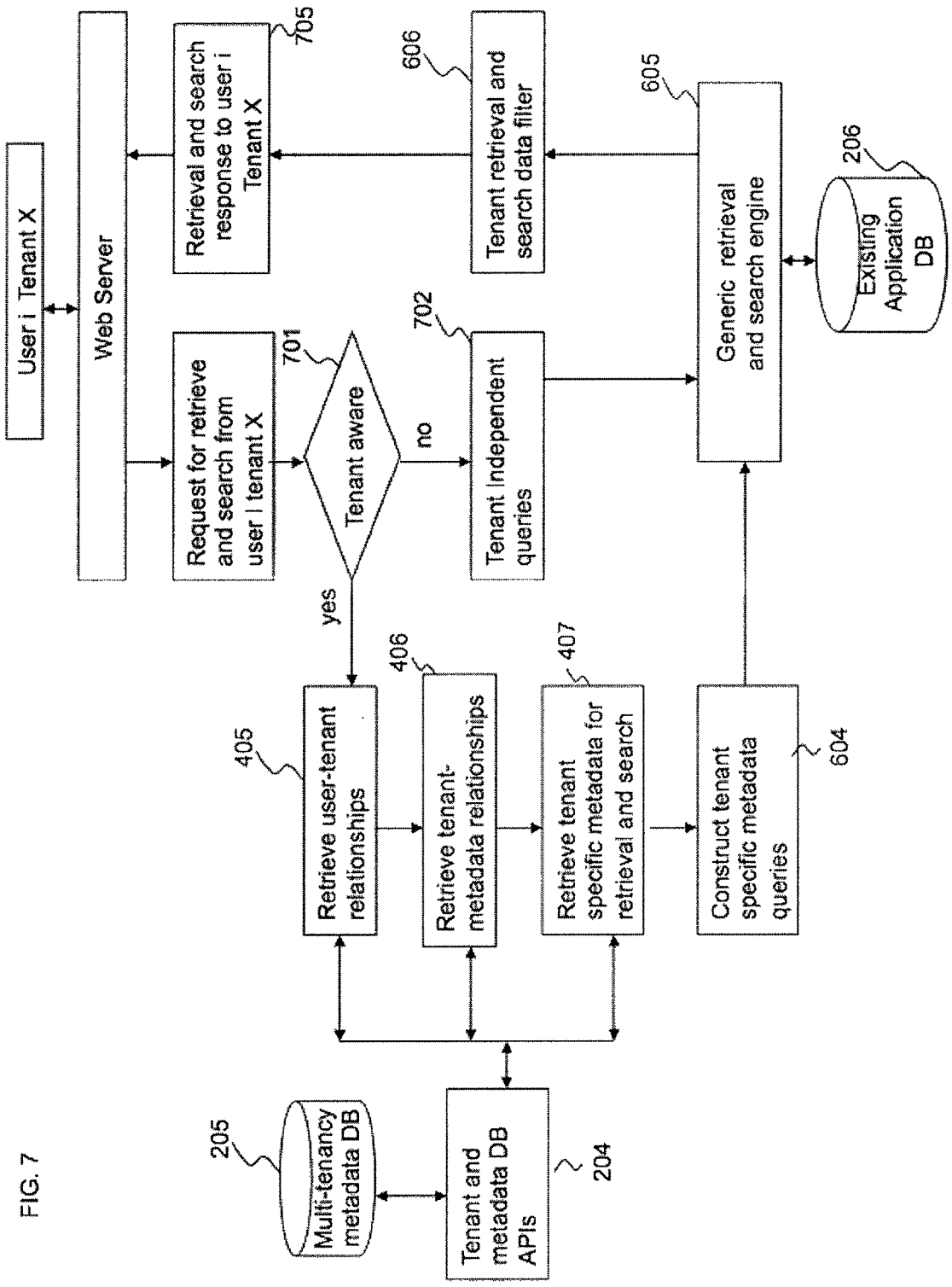
FIG. 7 is a flowchart for processing tenant-aware retrieval and search requests according to an embodiment of the present disclosure.

FIG. 7 is a flowchart for processing a tenant-aware retrieval and search request. A user I from tenant X sends a retrieval/search request to the generic retrieval and search engine 605 through the tenant specific metadata services module 404. The generic retrieval and search engine 605 is checked for its tenant awareness at block 701. If the generic retrieval and search engine 605 is tenant aware then tenant specific data is retrieved at blocks 405, 406, 407 from the multi-tenancy database 205 through the tenant and metadata database APIs 204. Once the tenant specific metadata is available the tenant specific metadata services module 404 constructs tenant specific metadata queries 604 and forwards the queries to the generic retrieval and search engine 605, which accesses the database 206 to find a search result which is passed to the tenant retrieval and search data filter 606 to filter out the tenant specific data before returning the search result to the requesting user from tenant X 705. If the system is not tenant aware, then the retrieval/search queries will be performed as tenant independent queries 702 and the request proceeds in the existing application 605.

It is to be understood that the present invention may be implemented in various forms of hardware, software, firmware, special purpose processors, or a combination thereof. In one embodiment, the present invention may be implemented in software as an application program tangibly embodied on a program storage device. The application program may be uploaded to, and executed by, a machine comprising any suitable architecture.

Figure 8:
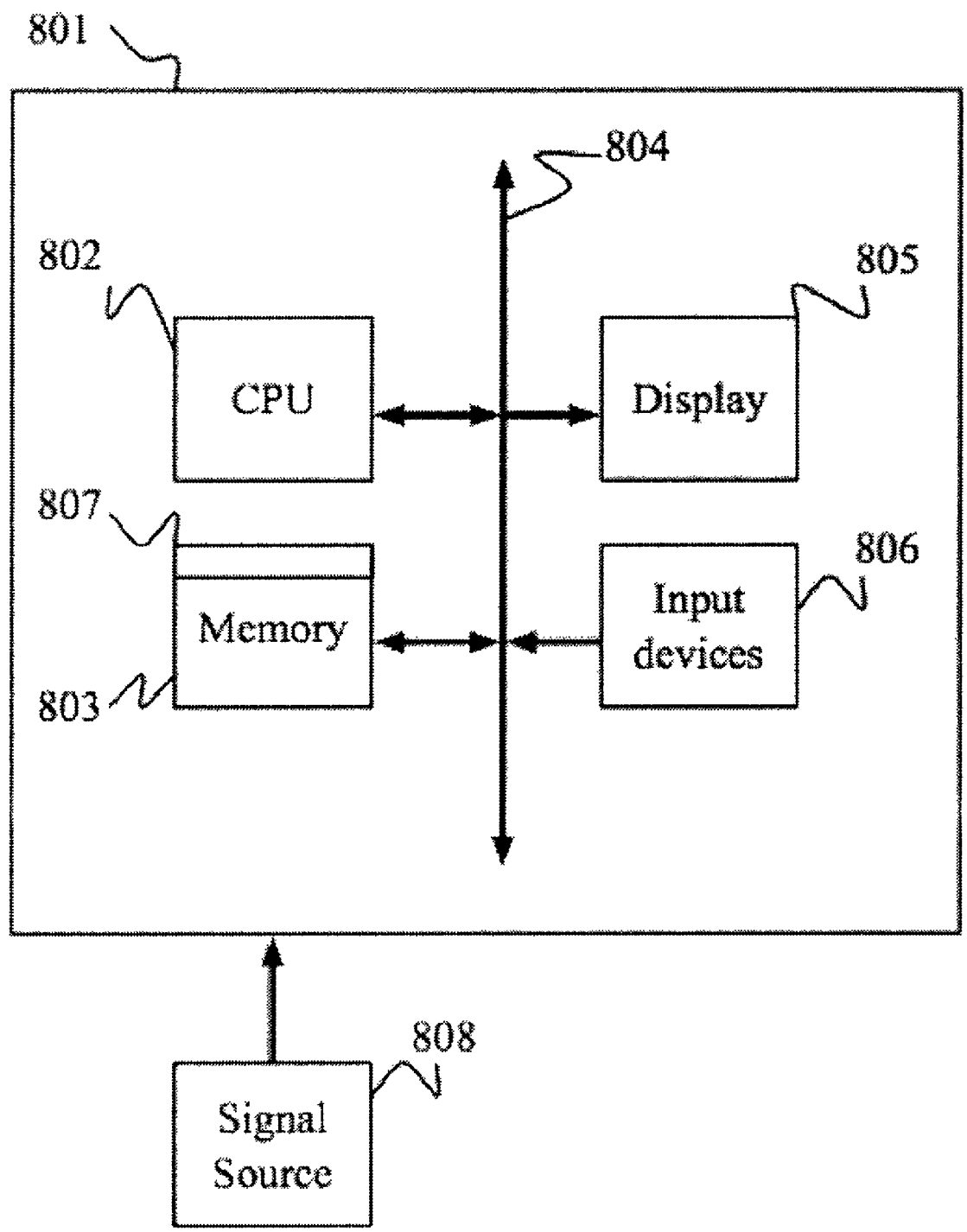
FIG. 8 is a diagram of a computer system for implemented a computer system according to FIGS. 2-7.

Referring to FIG. 8, according to an embodiment of the present invention, a computer system 801 for interacting with a non-tenant aware SaaS application to support multi-tenancy can comprise, inter alia, a central processing unit (CPU) 802, a memory 803 and an input/output (I/O) interface 804. The computer system 801 is generally coupled through the I/O interface 804 to a display 805 and various input devices 806 such as a mouse and keyboard. The support circuits can include circuits such as cache, power supplies, clock circuits, and a communications bus. The memory 803 can include random access memory (RAM), read only memory (ROM), disk drive, tape drive, etc., or a combination thereof. The present invention can be implemented as a routine 807 that is stored in memory 803 and executed by the CPU 802 to process the signal from the signal source 808, e.g., the user or administrator, or non-tenant aware application. As such, the computer system 801 is a general purpose computer system that becomes a specific purpose computer system when executing the routine 807 of the present invention.

The computer platform 801 also includes an operating system and micro instruction code. The various processes and functions described herein may either be part of the micro instruction code or part of the application program (or a combination thereof) which is executed via the operating system. In addition, various other peripheral devices may be connected to the computer platform such as an additional data storage device and a printing device.

It is to be further understood that, because some of the constituent system components and method steps depicted in the accompanying figures may be implemented in software, the actual connections between the system components (or the process steps) may differ depending upon the manner in which the present invention is programmed. Given the teachings of the present invention provided herein, one of ordinary skill in the related art will be able to contemplate these and similar implementations or configurations of the present invention.

Having described embodiments for a system and method for a non-tenant aware SaaS application supporting multi-tenancy, it is noted that modifications and variations can be made by persons skilled in the art in light of the above teachings. It is therefore to be understood that changes may be made in the particular embodiments of the invention disclosed which are within the scope and spirit of the invention as defined by the appended claims. Having thus described the invention with the details and particularity required by the patent laws, what is claimed and desired protected by Letters Patent is set forth in the appended claims.

What is claimed is:

1. A method for providing multi-tenant services comprising:
    receiving a request from a user;
    establishing tenancy information for the user, wherein the tenancy information is selected which corresponds to a tenant of the user from among multiple tenants;
    customizing the request according to the tenancy information established for the user;
    forwarding the request to an application that is not multi-tenant aware;
    receiving results of the request from the application;
    customizing the results according to the tenancy information established for the user and corresponding to the tenant of the user, wherein customizing the results according to the tenancy information established for the user comprises generating a tenant specific metadata wrapper comprising a tenant specific data filter, applying the tenant specific metadata wrapper to the multi-user application, and filtering results of the multi-user application according to the tenant specific data filter; and
    returning customized results to the user.

2. The method of claim 1, wherein establishing tenancy information for the user comprises accessing a multi-tenancy metadata database to retrieve a user-tenant relationship, a tenant-metadata relationship, tenant specific metadata, and a tenant specific metadata dependent application program interface.

3. The method of claim 1, wherein customization is performed in a presentation layer.

4. The method of claim 1, wherein the customization is performed in a search layer.

5. The method of claim 1, wherein establishing the tenancy information for the user further comprises selecting tenant specific metadata, wherein the tenant specific metadata includes a workflow for customizing the multi-user application.

6. The method of claim 1, wherein establishing the tenancy information for the user further comprises selecting tenant specific metadata, wherein the tenant specific metadata includes an application specific parameter for customizing the multi-user application.

7. The method of claim 1, wherein customizing the results further comprises filtering the results according to tenancy information.

8. The method of claim 1, further comprising customizing the application according to the tenancy information for performing the customization of the request and results.

9. A non-transitory computer readable medium embodying instructions executable by a processor to perform a method for providing multi-tenant services comprising:
   receiving a request from a user;
   establishing tenancy information for the user, wherein the tenancy information is selected which corresponds to a tenant of the user from among multiple tenants;
   customizing the request according to the tenancy information established for the user;
   forwarding the request to an application that is not multi-tenant aware;
   receiving results of the request from the application;
   customizing the results according to the tenancy information established for the user and corresponding to the tenant of the user, wherein customizing the results according to the tenancy information established for the user comprises generating a tenant specific metadata wrapper comprising a tenant specific data filter, applying the tenant specific metadata wrapper to the multi-user application, and filtering results of the multi-user application according to the tenant specific data filter; and
   returning customized results to the user.

10. The computer readable medium of claim 9, wherein establishing tenancy information for the user comprises accessing a multi-tenancy metadata database to retrieve a user-tenant relationship, a tenant-metadata relationship, tenant specific metadata, and a tenant specific metadata dependent application program interface.

11. The computer readable medium of claim 9, wherein customization is performed in a presentation layer.

12. The computer readable medium of claim 9, wherein the customization is performed in a search layer.

13. The computer readable medium of claim 9, wherein establishing the tenancy information for the user further comprises selecting tenant specific metadata, wherein the tenant specific metadata includes a workflow for customizing the multi-user application.

14. The computer readable medium of claim 9, wherein establishing the tenancy information for the user further comprises selecting tenant specific metadata, wherein the tenant specific metadata includes an application specific parameter for customizing the multi-user application.

15. The computer readable medium of claim 9, wherein customizing the results further comprises filtering the results according to tenancy information.

16. The computer readable medium of claim 9, further comprising customizing the application according to the tenancy information for performing the customization of the request and results.

17. A system for supporting multi-tenancy communications with a non-tenant aware application executing on a processor comprising:
   an input means for receiving a request from a user device;
   a multi-tenancy metadata database stored in a non-transitory computer readable medium in communication with the system for storing a user-tenant relationship, customization parameters, tenant-metadata relationships and application interfaces; and
   a tenant aware means for establishing tenancy information for the user from the multi-tenancy metadata database, customizing the request for a tenant of the user including the tenancy information, and forwarding the request to the non-tenant aware application, wherein the non-tenant aware application generates results corresponding to the request and returns the results to the tenant aware means, wherein the tenant aware means customizes the results for the tenant, and returns customized results to the user device,
   wherein customizing the results for the tenant comprises generating a tenant specific metadata wrapper comprising a tenant specific data filter, applying the tenant specific metadata wrapper to the non-tenant aware application, and filtering results of the non-tenant aware application according to the tenant specific data filter.

* * * * *